US006958551B2

(12) United States Patent
Janssen

(10) Patent No.: US 6,958,551 B2
(45) Date of Patent: Oct. 25, 2005

(54) VEHICLE CODED IGNITION LOCK USING A MAGNETIC SENSOR

(75) Inventor: David C. Janssen, Whitefish Bay, WI (US)

(73) Assignee: Strattec Security Corporation, Milwaukee, WI (US)

( * ) Notice: Subject to any disclaimer, the term of this patent is extended or adjusted under 35 U.S.C. 154(b) by 426 days.

(21) Appl. No.: 10/179,127

(22) Filed: Jun. 25, 2002

(65) Prior Publication Data

US 2003/0234579 A1 Dec. 25, 2003

(51) Int. Cl.$^7$ .......................... B60R 25/04; H04Q 1/00
(52) U.S. Cl. ..................... 307/10.3; 70/252; 340/5.31
(58) Field of Search ....................... 307/10.3, 10.5; 70/186, 389, 276, 278.3, 278.7, 359, 252; 361/154, 187, 171, 172, 5.31, 5.34

(56) References Cited

U.S. PATENT DOCUMENTS

| 1,059,759 A | 4/1913 | Preston |
| 1,114,709 A | 10/1914 | Muler |
| 1,438,839 A | 12/1922 | Levey |
| 2,065,468 A | 12/1936 | Keil |

(Continued)

FOREIGN PATENT DOCUMENTS

| DE | 3940061 | 6/1991 |
| EP | 0230484 | 8/1987 |
| EP | 0388997 | 9/1990 |
| EP | 0400453 | 12/1990 |
| EP | 0464278 | 1/1992 |
| EP | 0355475 | 2/1992 |
| EP | 0475616 | 3/1992 |
| FR | 2249228 | 6/1975 |
| IT | 531433 | 8/1955 |
| JP | 5544071 | 3/1980 |
| SU | 522319 | 10/1976 |
| WO | WO 8404128 | 10/1984 |
| WO | WO 8603797 | 7/1986 |
| WO | WO 8800635 | 1/1988 |

OTHER PUBLICATIONS

AZSCO Technologies Welcome to Our Website; printed Apr. 18, 2002; http://azsctech.com/main.html.
AZSCO Technologies Security Applications; printed Apr. 18, 2002; http://azscotech.com/security.html.
AZSCO Technologies Industrial & Commercial Applications; printed Apr. 18, 2002; http://azscotech.com/applications.html.
AZSCO Technologies How the Switch Works; printed Apr. 18, 2002; http://azscotech.com/how.html.
Adel S. Sedra, Kenneth C. Smith; Microelectronic Circuits; p. 432; copyright 1982, CBS College Publishing, New York, NY, no date.

Primary Examiner—Rajnikant B. Patel
(74) Attorney, Agent, or Firm—Michael Best & Friedrich LLP

(57) ABSTRACT

A lock for a vehicle-ignition circuit. The lock includes a sleeve, a cylinder rotatably coupled within the sleeve and having a keyway therein that receives a key that allows the cylinder to rotate, and a sensor including a pair of spaced-apart switch contacts and a movable electrically-conductive body. The body is movable between a first position where the body is located away from at least one of the switch contacts and a second position where the body contacts both of the switch contacts. The sensor defines a region in which the sensor is responsive to the effects of an actuator, and is coupled to the sleeve so that the region is located within the rotation of the cylinder and is in an orientation in which the body is located in the first position in the absence of the actuator within the region.

45 Claims, 6 Drawing Sheets

U.S. PATENT DOCUMENTS

| | | | |
|---|---|---|---|
| 2,613,258 A | 10/1952 | Azano | |
| 3,309,549 A | 3/1967 | Bluemink | |
| 3,402,582 A | 9/1968 | Jacobi | |
| 3,442,102 A | 5/1969 | Butts | |
| 3,651,329 A | 3/1972 | Marlowe et al. | |
| 3,689,885 A | 9/1972 | Kaplan et al. | |
| 3,705,369 A | 12/1972 | Schwendeman | |
| 3,732,465 A | 5/1973 | Palmer | |
| 3,752,960 A | 8/1973 | Walton | |
| 3,764,859 A | 10/1973 | Wood et al. | |
| 3,774,424 A | 11/1973 | Ehrat | |
| 3,787,714 A | 1/1974 | Resnick et al. | |
| 3,787,812 A | 1/1974 | Armstrong | |
| 3,794,796 A | 2/1974 | Dwan | |
| 3,859,624 A | 1/1975 | Kriofsky et al. | |
| 3,914,967 A | 10/1975 | Arman | |
| 3,921,040 A | 11/1975 | Clarke | |
| 3,964,024 A | 6/1976 | Hutton et al. | |
| 4,074,547 A | 2/1978 | Seidewand | |
| 4,074,548 A | 2/1978 | Milton | |
| 4,148,372 A | 4/1979 | Schroeder | |
| 4,186,578 A | 2/1980 | Sommer | |
| 4,189,712 A | 2/1980 | Lemelson | |
| 4,192,400 A | 3/1980 | McEwan | |
| 4,196,347 A | 4/1980 | Hadley | |
| 4,200,227 A | 4/1980 | Lemelson | |
| 4,250,482 A | 2/1981 | Kouchich et al. | |
| 4,250,533 A | 2/1981 | Nelson | |
| 4,262,632 A | 4/1981 | Hanton | |
| 4,267,494 A | 5/1981 | Matsuoka et al. | |
| 4,287,733 A | 9/1981 | Gomez-Olea | |
| 4,291,267 A | 9/1981 | Bonnet | |
| 4,297,569 A | 10/1981 | Flies | |
| 4,298,792 A | 11/1981 | Granholm et al. | |
| 4,309,882 A | 1/1982 | Maiocco | |
| 4,327,353 A | 4/1982 | Beard et al. | |
| 4,332,306 A | 6/1982 | Turatti | |
| 4,333,327 A | 6/1982 | Wake | |
| 4,337,462 A | 6/1982 | Lemelson | |
| 4,361,153 A | 11/1982 | Slocum et al. | |
| 4,366,466 A | 12/1982 | Lutz | |
| 4,415,893 A | 11/1983 | Roland | |
| 4,427,967 A | 1/1984 | Maiocco | |
| 4,435,649 A | 3/1984 | Vandigriff | |
| 4,454,736 A | 6/1984 | Mochida | |
| 4,458,512 A | 7/1984 | Gelhard | |
| 4,471,343 A | 9/1984 | Lemelson | |
| 4,507,944 A | 4/1985 | Widen et al. | |
| 4,532,932 A | 8/1985 | Batty, Jr. | |
| 4,546,266 A | 10/1985 | Zenick et al. | |
| 4,602,253 A | 7/1986 | Kreft | |
| 4,603,563 A | 8/1986 | Mochida et al. | |
| 4,630,457 A | 12/1986 | Kincaid et al. | |
| 4,638,882 A | 1/1987 | Sato | |
| 4,643,009 A | 2/1987 | Sato | |
| 4,656,458 A | 4/1987 | Iwata | |
| 4,663,952 A | 5/1987 | Gelhard | |
| 4,692,834 A | 9/1987 | Iwahashi et al. | |
| 4,734,693 A | 3/1988 | Dluhosch et al. | |
| 4,737,762 A | 4/1988 | Ohnishi | |
| 4,738,334 A | 4/1988 | Weishaupt | |
| 4,789,859 A | * 12/1988 | Clarkson et al. | 340/5.65 |
| 4,848,115 A | 7/1989 | Clarkson et al. | |
| 4,862,139 A | 8/1989 | Fukamachi et al. | |
| 4,868,409 A | 9/1989 | Tanaka et al. | |
| 4,868,559 A | 9/1989 | Pinnow | |
| 4,891,363 A | 1/1990 | Nakamura et al. | |
| 4,916,333 A | 4/1990 | Kowalski | |
| 4,920,338 A | 4/1990 | Tsunoda et al. | |
| 4,981,026 A | 1/1991 | Sakuno et al. | |
| 4,983,947 A | 1/1991 | Mullen et al. | |
| 4,990,906 A | 2/1991 | Keil et al. | |
| 5,003,801 A | 4/1991 | Stinar et al. | |
| 5,005,393 A | 4/1991 | Ewalds et al. | |
| 5,006,843 A | 4/1991 | Hauer | |
| 5,012,236 A | 4/1991 | Troyk et al. | |
| 5,014,049 A | 5/1991 | Bosley | |
| 5,083,362 A | 1/1992 | Edgar et al. | |
| 5,084,699 A | 1/1992 | DeMichele | |
| 5,095,309 A | 3/1992 | Troyk et al. | |
| 5,117,097 A | 5/1992 | Kimura et al. | |
| 5,121,102 A | 6/1992 | Stricklin, Jr. | |
| 5,156,032 A | 10/1992 | Edgar | |
| 5,186,031 A | 2/1993 | Janssen et al. | |
| 5,195,341 A | 3/1993 | Neiuwkoop | |
| 5,202,580 A | 4/1993 | Janssen | |
| 5,271,253 A | 12/1993 | Cassada et al. | |
| 5,287,098 A | 2/1994 | Janssen | |
| 5,289,706 A | 3/1994 | Krebs et al. | |
| 5,332,992 A | 7/1994 | Woods | |
| 5,337,588 A | 8/1994 | Chhatwal | |
| 5,455,571 A | * 10/1995 | Janssen | 340/5.31 |
| 5,530,428 A | 6/1996 | Woods | |
| 5,551,267 A | * 9/1996 | Janssen et al. | 70/252 |
| 5,653,131 A | 8/1997 | Shibata et al. | |
| 5,656,867 A | 8/1997 | Kokubu | |
| 5,673,021 A | 9/1997 | Woods | |
| 5,793,122 A | 8/1998 | Dingwall et al. | |
| 5,836,187 A | 11/1998 | Janssen et al. | |
| 5,861,800 A | 1/1999 | Peters et al. | |
| 5,880,659 A | 3/1999 | Woods | |
| 6,067,824 A | 5/2000 | Osborne | |

* cited by examiner

VEHICLE CODED IGNITION LOCK USING A MAGNETIC SENSOR

BACKGROUND OF THE INVENTION

The present invention relates generally to vehicle ignition locks, and more particularly to a vehicle ignition lock including a magnetic sensor.

Over the last several years, it has become increasingly desirable to improve the anti-tampering features of lock and key sets. This is particularly true with respect to vehicle ignition systems where vehicle theft has almost developed into an art form. To combat vehicle theft, automotive manufacturers have incorporated a variety of vehicular anti-tampering systems within vehicles. For example, numerous anti-tampering systems include electrical or electronic interlocks working in cooperation with a mechanical lock system. While the systems of the prior art have greatly enhanced the anti-theft features of lock systems, it is desirable to improve upon the current systems.

SUMMARY OF THE INVENTION

Accordingly, in one embodiment, the invention provides a lock for a vehicle-ignition circuit. The lock includes a sleeve, a cylinder coupled within the sleeve and having a keyway therein that receives a key used to operate the cylinder, and a sensor including a pair of spaced-apart switch contacts and a movable electrically-conductive body. The body is movable between a first position where the body is located away from at least one of the switch contacts and a second position where the body contacts both of the switch contacts. The sensor defines a region in which the sensor is responsive to the effects of an object, and is coupled to the sleeve so that the region is located within the cylinder and is in an orientation in which the body is located in the first position in the absence of the object within the region.

In another embodiment, the invention provides a vehicle ignition lock including a cylinder having a keyway in which a key is insertable to operate the cylinder, an electrical circuit having an open state and a closed state, and a body movable to open and close the electrical circuit. The lock further includes an actuator coupled to the cylinder and movable by operation of the cylinder. The actuator is movable by the cylinder between a first position in which an interaction of the actuator and the body moves the body to change the state of the electrical circuit and a second position in which the interaction does not move the body to change the state of the electrical circuit.

In yet another embodiment, the lock includes a cylinder having a keyway in which a key is insertable to operate the cylinder, a switch with at least two switch contacts, an open state, and a closed state, a body movable with respect to the contacts to open and close the switch, and an actuator movable by the cylinder with respect to the body. At least one of the actuator and the body has at least one magnetic field. The movement of the actuator varies the interaction of the at least one magnetic field with the actuator or the body. The body is responsive to the varying interaction by changing to one of the open and closed states.

In another embodiment, the invention provides a vehicle-ignition system including a lock having a cylinder rotatably coupled with a sleeve. The cylinder includes a magnetic actuator and a keyway. The keyway receives a key that allows the cylinder to rotate. The system further includes a coded-signal circuit configured to generate a coded signal in response to the rotational position of the cylinder, a comparator configured to generate an activation signal when the coded signal is acceptable, and a sensor coupled to the sleeve and connected in circuit with the coded-signal circuit. The sensor is configured to define an active region in which the sensor is responsive to the effects of a magnetic field, to interrupt the circuit unless the actuator is properly rotated to the active region, and to complete the circuit causing the coded signal to be generated when the actuator is rotated within the region.

In another embodiment, the invention provides a vehicle-security system including a coded-signal circuit configured to selectively generate a coded signal, and a sensor. The sensor is configured to be responsive to a magnetic field of a magnet, to enable the generation of the coded signal only when the magnet is rotated within an active region, and to be non-responsive to the magnetic field when the magnet is outside of the active region thereby preventing the generation of the coded signal.

In yet another embodiment, the invention provides an ignition-lock system for a vehicle. The system includes a sleeve, a cylinder coupled within the sleeve, and a sensor coupled to the sleeve. The sensor has an active state and an active region. The system further includes an actuator coupled to the cylinder to move with the cylinder. The actuator causes the sensor to be in the active state when the actuator is within the active region. The system also includes a memory having a code and a comparator coupled to the memory. The comparator is configured to receive a coded signal, including the code, from the memory when the sensor is in the active state and to generate an activation signal when the memory supplies the correct code.

DETAILED DESCRIPTION

Before any embodiments of the invention are explained, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "connected," "coupled," and "mounted" are used broadly and encompass both direct and indirect connection, coupling, and mounting. In addition, the terms "connected" and "coupled" are not restricted to physical or mechanical connections or couplings.

Figure 1:
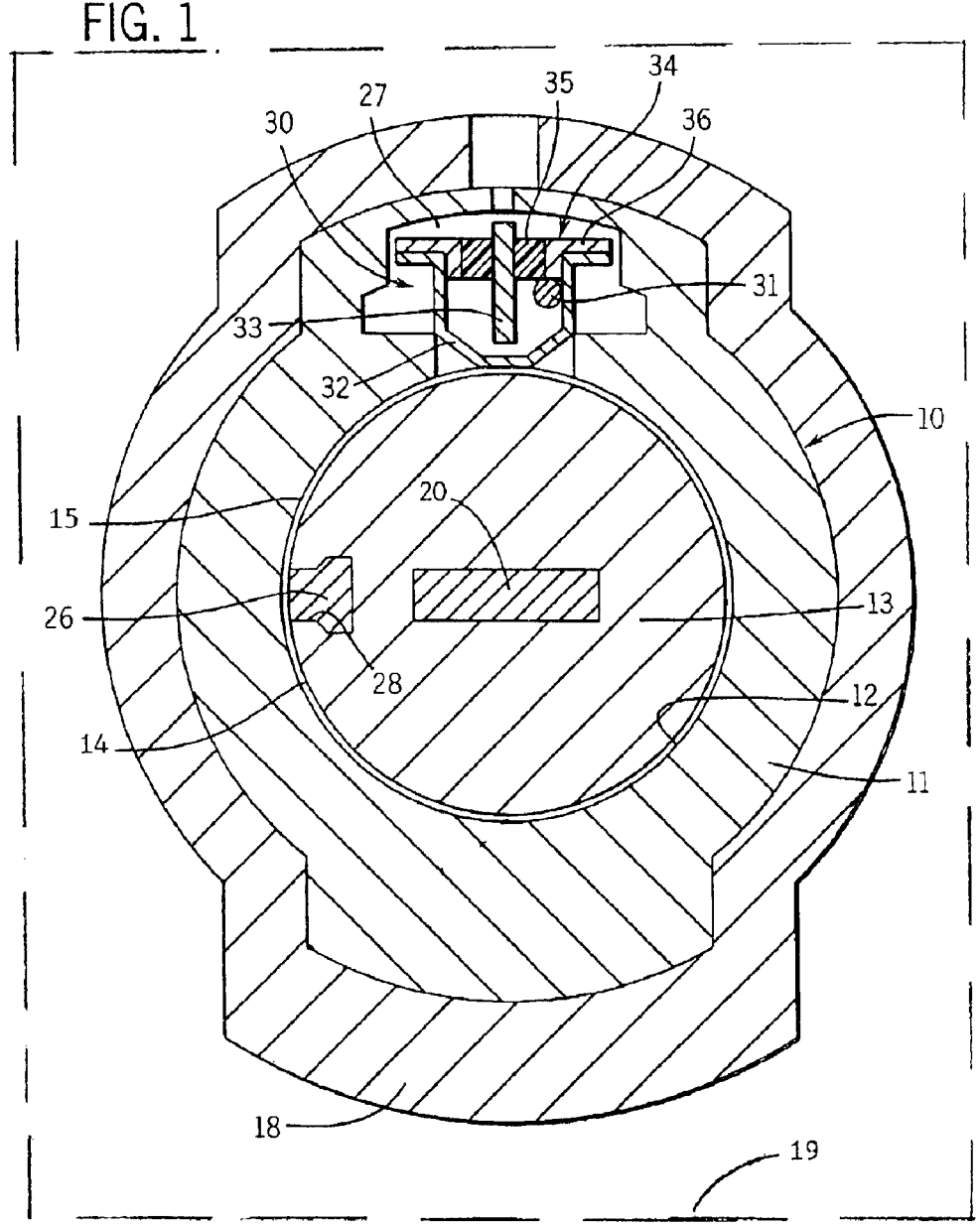
FIG. 1 is a cross sectional view of a vehicle ignition lock including a magnetic sensor switch in accordance with one embodiment of the present invention, shown mounted in the steering column of a vehicle.

Referring now to the drawings, FIG. 1 illustrates one embodiment of an ignition lock for a vehicle, generally designated by the numeral 10, in accordance with some principles of the present invention. The vehicle-ignition lock 10 includes a cylinder-tumbler lock having a sleeve 11, a lock cylinder 13 (also referred to as a plug) rotatably mounted within the sleeve 11, and a magnetic sensor 30 (also referred to herein as sensor switch 30). For the embodiments described below, unless specified otherwise, the sensor 30 is mounted on the sleeve 11 at a position corresponding to a START position and detects when the cylinder 13 has been rotated to the START position. For these embodiments, the sensor 30 ensures that the ignition circuit of the vehicle generates a start signal only when a mating key (not shown) is placed within a keyway 20 of the cylinder 13 and the cylinder 13 moves to the START position. The beginning and end positions correspond to the OFF and START positions, respectively, in a typical vehicle ignition lock. The lock 10 also typically includes a third position, which is referred to herein as a RUN position, between the OFF and START positions. In other embodiments, the location of the magnetic sensor 30 may vary. For example, the sensor 30 can be coupled to the sleeve corresponding to the OFF position and, for this embodiment, the sensor 30 detects when the cylinder 13 moves from the OFF position.

Thus, the sensor 30 can be coupled to the sleeve in any number of positions (referred to herein as active positions). When the cylinder 13 moves to the active position, the sensor 30 detects that the cylinder is in that position. In yet other embodiments, two or more magnetic sensor switches 30 may be used to provide multiple active positions.

The lock 10 is mounted within a housing 18, which, in one embodiment, is the housing for the steering column of a vehicle (schematically represented by dashed line 19). However, it is within the scope of the present invention to mount the lock 10 in any desired location within the vehicle 19. Additionally, it is envisioned that certain aspects of the lock 10 can be used in other environments (e.g., coupled with equipment, buildings, etc.).

For the embodiment shown in FIG. 1, the sleeve 11 comprises a hollow, substantially cylindrical member, which includes an inner surface 12, and is fixed within the housing 18. However, in other embodiments, the sleeve 11 and the housing 18 form a single component. The sleeve 11 includes a compartment 27 which contains the sensor 30.

Figure 5:
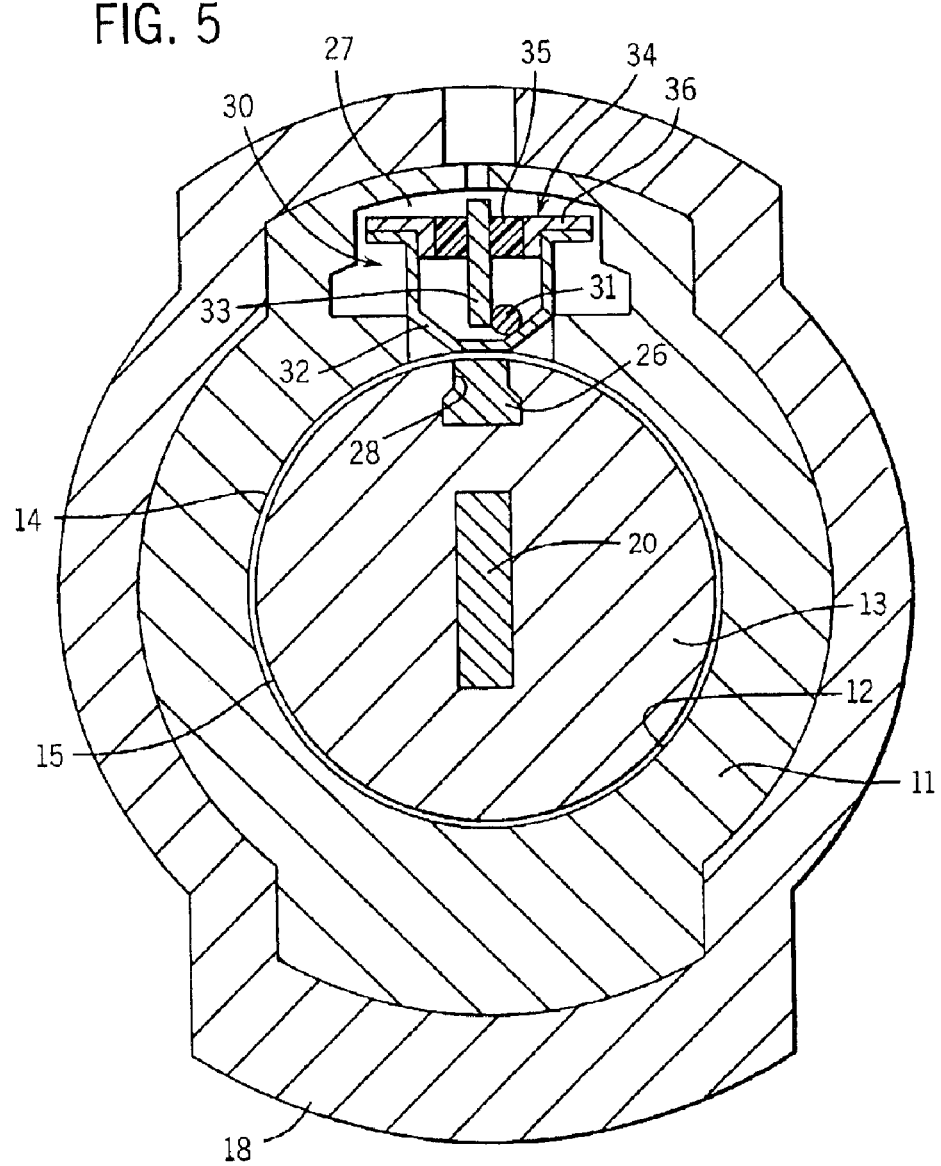
FIG. 5 is a view similar to that of FIG. 1, illustrating the lock cylinder of the mechanical ignition lock rotated to an active position and the magnetic sensor switch operated to the closed circuit position.

In one preferred embodiment, the cylinder 13 is an elongated, generally solid, substantially cylindrical member which is mounted within sleeve 11 for rotation between an OFF position, illustrated in FIG. 1, and a START position, illustrated in FIG. 5. The cylinder 13 has an outer surface 14 that defines an interface 15 with the inner surface 12 and includes a keyway 20 adapted to receive a mating or "correct" key. The key includes notched edges for engaging a plurality of tumblers (not shown) on the lock cylinder 13. The tumblers engage the sleeve to prevent rotation of the cylinder 13 for a key-out condition in the manner known in the art. When the mating key is present in the keyway 20, the tumblers are retracted into the cylinder 13, allowing the cylinder 13 to rotate between the OFF position (FIG. 1) and the START position. Before proceeding further, it should note that the term cylinder, unless specified otherwise, includes any member that has a keyway and that moves in response to a mating key moving the member when the key is properly inserted in the keyway. The lock cylinder may comprise a variety of shapes that may or may not include a cylindrical portion.

In this preferred embodiment, an actuator 26, which can be a magnet, is mounted on the cylinder 13 adjacent to the interface 15. In one embodiment, the actuator 26 is a permanent magnet that is located within a recess 28 in the outer surface of the cylinder 13. The recess is spaced apart about 90° along the rotational interface of surfaces 12 and 14 from the sensor 30 when the cylinder 13 is in the OFF position. However, other magnets and other spacing arrangements can be used. Additionally, in some embodiments the actuator 26 is not a magnet, but is a ferromagnetic metal.

The sensor 30 preferably is located along the rotational interface of surfaces 12 and 14. As will be shown, the actuator 26 operates the sensor 30 when the actuator 26 is brought into the proximity of the sensor 30 when the cylinder 13 is rotated from the OFF position shown in FIG. 1 to the ON position shown in FIG. 5. In one embodiment, the operation of the sensor 30 completes a circuit path that produces an actuating or ignition enable signal. Electronic circuits of the vehicle 19 are responsive to the ignition enable signal to activate the vehicle ignition circuit for running the vehicle 19. In one specific embodiment, the sensor 30 is connected in a circuit that supplies the ignition enable signal to a microprocessor of a vehicle control module of the vehicle. In another embodiment, the sensor 30 is connected in a coded-signal circuit 40, shown in FIG. 7, which is coupled to an anti-tampering system of a vehicle control module. Thus, the coded-signal circuit 40 and the sensor 30 can be combined to form a security system.

Figure 2:
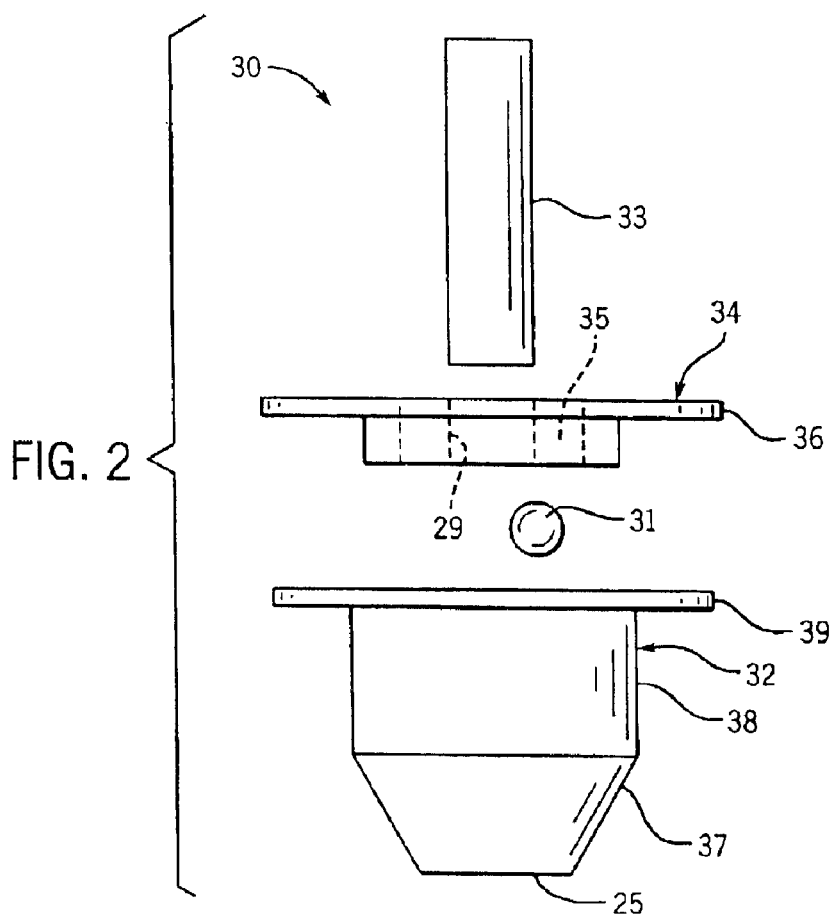
FIG. 2 is an exploded view of the magnetic sensor switch of the vehicle ignition lock of FIG. 1.
Figure 3:
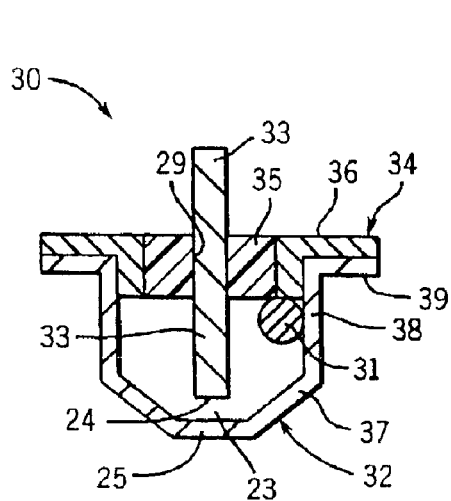
FIG. 3 is an assembled view of the magnetic sensor switch with a ball contact of the magnetic sensor switch shown in an open circuit position.
Figure 4:
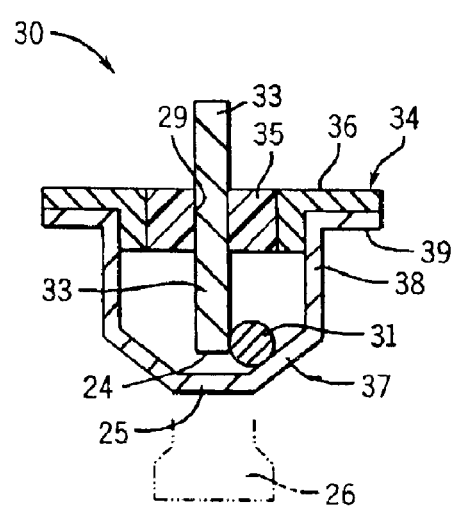
FIG. 4 is a view similar to that of FIG. 3, and with the ball contact in a closed circuit position.

In the embodiment shown in FIGS. 2–4, the magnetic sensor 30 includes a switch member 31, a case 32, a conductive member 33 and a seal cap 34. The switch member 31 is located within the case 32, which is closed by the seal cap 34. The seal cap 34 is secured to the case 32, forming a hermetically sealed enclosure for the switch member 31. The conductive member 33 is carried by the seal cap 34 and has one end projecting into the interior of the enclosure and the opposite end located on the exterior of the enclosure.

The switch member 31 (also referred to as a body or wipe) is of an electrically conductive material, and preferably a ferromagnetic material. In one highly preferred embodiment, the switch member is spherical in shape, i.e., a ball-shaped member, and is magnetized to have north and south poles at opposite ends of an axis through the ball-shaped member.

The case 32 is of an electrically conductive material and is preferably a non-magnetic material such as bronze or stainless steel. As will be discussed in more detail below, at least a portion of the case 32 acts as a first switch contact. For the preferred embodiment, the case 32 includes a cup-like body defined by a side wall 38 that terminates in an outwardly projecting, peripheral flange 39 at one end and merges with a base portion 25 at the opposite end. Preferably, the base portion 25 is generally flat and the side wall 38 is formed with at least one sloping angle portion 37. This sloping angle portion 37 controls the sensitivity of the sensor 30 and provides high closed-contact integrity between the case 32 and the conductive member 33. In some embodiments, the upper portion of the side wall 38 is circular in cross section. However, the cross section of the upper portion of the side wall 38 can be rectangular or some other geometric shape. Also, the sloping angle portion 37 of the case 32 can have many forms, including a rounded or a rectangular shape.

The conductive member 33 (also referred to as a second switch contact) is of a non-magnetic material and preferably is formed in the shape of a rod or pin having a circular cross section. The conductive member 33 is supported on the cap 34.

The cap 34 includes a ferromagnetic portion 36 and an insulated layer portion 35 for insulating the conductive member 33 from the ferromagnetic portion 36. The insulated layer portion 35 of the cap 34 includes an aperture 29 through which extends the conductive member 33, with one end 24 of the conductive member 33 spaced from the base 25. In one embodiment, the conductive member 33 is centered within the case 32 with end 24 spaced from the sloping angle portion 37 of the case 32, defining a gap 23 between the conductive member 33 and the sloping angle portion 37 of the case 32. The cap 34 preferably is welded to case 32 to provide a hermetically sealed bond between the case 32 and the cap 34.

Figure 7:
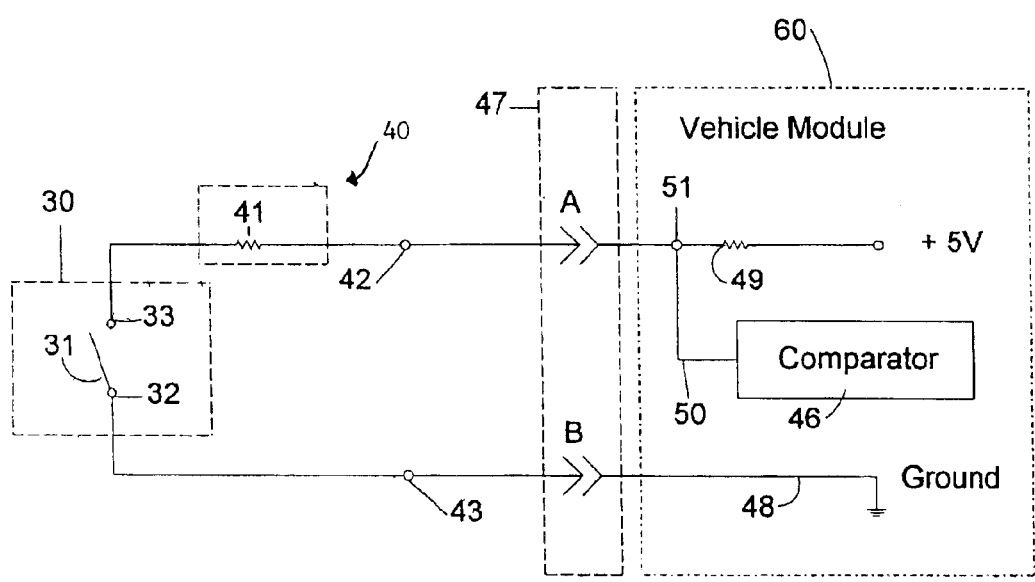
FIG. 7 is a schematic circuit and partial block diagram of a coded signal circuit coupled to a standard vehicle module.

In one embodiment, the case 32 and the conducting member 33 act as switch contacts of a switch (best shown in FIG. 7). That is, the case 32 can be electrically connected, for example, to ground, and acts as a first switch contact, and the conductive member 33 can be electrically connected to the coded signal circuit 40 and acts as a second switch contact. The switch member 31 is movable within the case 32 between a switch open position (shown in FIG. 3), where the switch member 31 is spaced from the conductive member 33, and a switch closed position (shown in FIG. 4), where the switch member 31 contacts both the case 32 and the conductive member 33. In the coded signal circuit 40 (FIG. 7), the sensor switch 30 has the appearance of a single pole, single throw switch which is open when the lock cylinder 13 is not in the active position and which is closed when the lock cylinder moves to the active position. As is stated above, preferably, the switch member 31 is formed of a ferromagnetic material so that movement of the switch member 31 is influenced by magnetic fields. The spherical shape of switch member 31 makes the switch member polarity insensitive. That is, the spherical-shaped switch member 31 can rotate in response to being subjected to a magnetic field produced by the actuator 26 to align the poles of the switch member with the opposite pole of the actuator 26. This allows the switch member to be attracted to the actuator 26 regardless of the orientation of the actuator 26 (i.e., with its north pole located at the outer surface of the lock cylinder 13 or with its south pole located at the outer surface of the lock cylinder 13). As is stated above, the case 32 and the conductive member 33 preferably are formed of non-magnetic materials so that they do not interfere with the magnetic effect of the actuator 26 on the switch member 31.

Referring to FIG. 3, when the switch is in the open position, the ferromagnetic portion 36 attracts the switch member 31, as shown by the location of the switch member 31. Because of this attraction, the sensor 30 can be positioned in any orientation, and will remain in the open position until the actuator 26 (FIG. 4) is moved into an activating region of the magnetic sensor switch 30 as will be described. One sensor 30 that is suitable for use as magnetic sensor switch is commercially available under the trade name MAGNASPHERE SWITCH, which is manufactured and sold by Magnasphere Corporation, a Delaware Corporation. Other switches responsive to a ferromagnetic material can be used.

Based on the foregoing description, one preferred embodiment of the present invention includes a cap 34 with a ferromagnetic portion 36, a permanently magnetized switch member 31, and a permanent magnet 26. Although one preferred embodiment is described herein, one skilled in the art will recognize that other combinations of ferromagnetic material and magnetized material can be used for the cap portion 26, the switch member 31, and the actuator 26 as summarized in Table 1 to achieve equivalent functions of the present invention.

TABLE 1

| Combinations of Materials | | | | |
|---|---|---|---|---|
| Combination | 1 | 2 | 3 | 4 |
| Cap Portion 36 | F | M | M | F |
| Switch Member 31 | M | F | M | M |
| Actuator 26 | M | M | M | F |

F = Ferromagnetic (not permanently magnetized)
M = Permanently Magnetized

Referring to Table 1, combination 1 is the first embodiment described herein. Combination 2 is a variant of combination 1, where the switch member 31 is of ferromagnetic material and the cap portion 36 and actuator 26 are permanently magnetized. In combinations 2, 3 and 4, the actuator 26 must have sufficient magnetic force (i.e. a stronger ferromagnetic or permanently magnetized piece) in order to attract switch member 31 away from cap portion 36.

Figure 6:
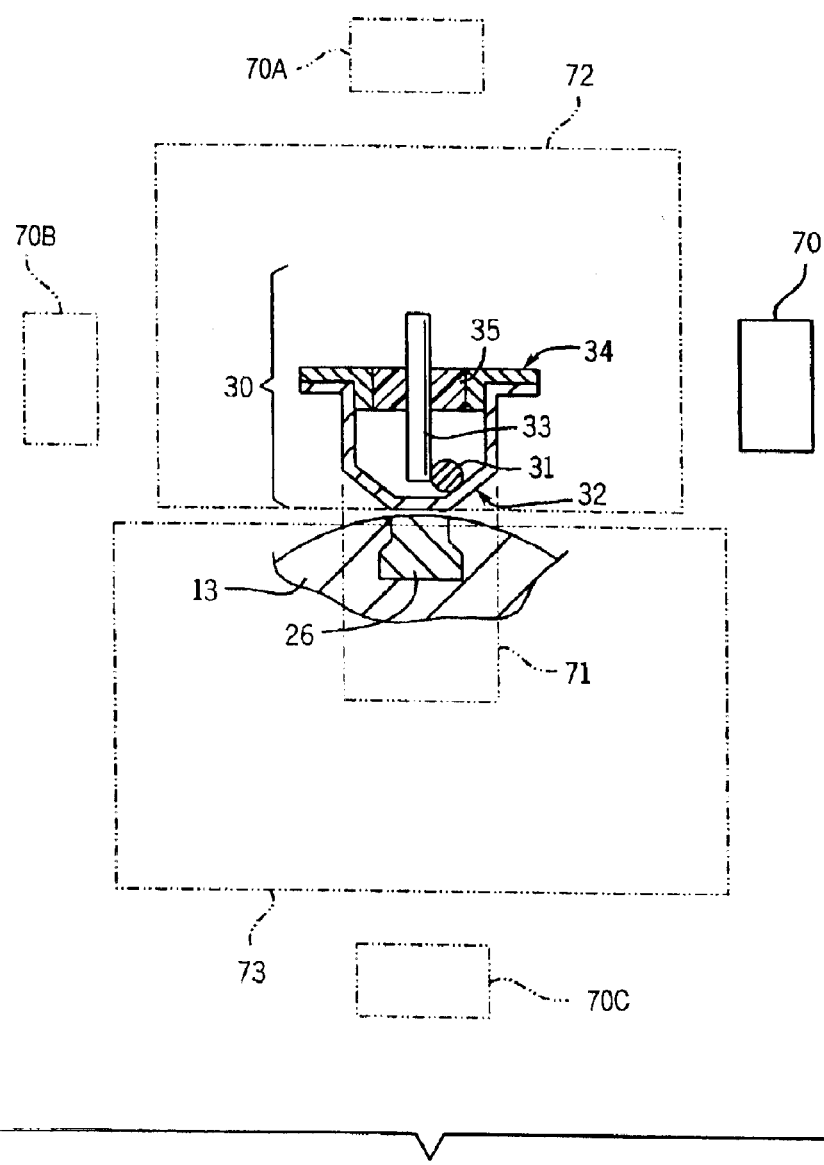
FIG. 6 is a partial cross sectional view of the magnetic sensor switch demonstrating that an intruder's magnet external to the lock does not cause the sensor to operate, and illustrates an activation area of the magnetic sensor switch.

Referring to FIG. 6, the sensor 30 is operated to the closed condition only when a magnetic field produced by the actuator 26 is adjacent to the base portion 25 of the sensor 30 (i.e., the actuator 26 is within an activation region represented by the dashed line block 71.) When this condition is satisfied, the switch member 31 "snaps" to the bottom of the case 32 and into contact with the conductive member 33. With this method of operation, the movement of ball member 31 is restricted to a generally linear or back and forth motion as the ball member is moved from adjacent the ferromagnetic portion 36 of the cap 34 into engagement with the conductive member 33, and back (i.e., when the actuator 26 is moved out of the activation region 71).

If an intruder attempts to compromise the ignition system by introducing an external magnet 70 to one side of the sensor 30 (shown in FIG. 6), the sensor 30 does not generate an ignition enable signal. Likewise, the sensor 30 does not respond to an external magnet 70A, 70B or 70C, placed in other positions which are outside the activation region 71 as represented by the dashed lines 70A, 70B or 70C in FIG. 6. An external magnet 70, 70A, 70B or 70C outside the activation region 71 does not induce the switch member 31 to make contact with the conductive member 33. For example, external magnets 70, 70A and 70B do not result in the switch member 31 closing the connection between the case 32 and the conductive member 33 because the external magnets 70, 70A and 70B do not move the switch member 31 into electrical contact with the case 32 and the conductive member 33. As another example, external magnet 70C cannot "approach" activation region 71 because of the interfering barriers, generally designated by numerals 72 and 73, provided by other physical components of the embodiment. Example physical components include the steering column housing 18, the sleeve 11, and the cylinder 13. The sensor 30 is strategically oriented relative to actuator 26 so that a circuit path is completed between the case 32 and the conductive member 33 only when the actuator 26 is moved into the proximity of case 32 and conductive member 33 (i.e., is within the activation region 71).

Referring to FIG. 7, in one embodiment, the sensor 30 is connected in a coded-signal circuit 40. Typically, the coded-signal circuit 40 is coupled directly to a standard vehicle module 60, such as a vehicle anti-tampering system provided by the vehicle manufacturer. The coded-signal circuit 40 produces an output signal having a magnitude that is within a predetermined range, and unless such output signal is produced and supplied to the vehicle module 60, the activation of the vehicle ignition system cannot occur. Thus, in this embodiment, the activation of the vehicle-ignition system requires not only operating the sensor 30, but also producing an output signal having a magnitude within a predetermined range.

The coded-signal circuit 40 includes a resistor 41 with a selected resistance value. Resistor 41 is connected in series with the sensor 30 between nodes 42 and 43. The resistor 41 at node 42 is connected through a pull-up resistor 49 to a source of logic level voltage and node 43 is connected to ground. The value of resistor 41 is pre-selected for defining the magnitude or "value" of the output signal produced at node 42 when the sensor 30 is closed. The node 42 is coupled to node 51, which is connected to an input 50 of a comparator 46. The operation of the comparator 46 is discussed in further detail below. In one embodiment, the comparator 46 is implemented using a microprocessor and software, where the microprocessor executes software instructions to perform one or more comparisons. Of course, the comparator 46 may be implemented using integrated and discrete circuit components. It should also be understood that the comparator 46 may include multiple comparators.

The pull-up resistor 49 is connected between node 51 and a source of logic level voltage. Typically, the connections between the ignition switch and the vehicle module 60 are made by a multi-connector, such as connector 47 which includes connector terminals A and B. Terminals A and B connect nodes 42 and 43, respectively, to the vehicle module 60.

The following is a brief description of the operation of the vehicle ignition lock 10 and of the coded signal circuit 40. Referring to FIGS. 1 and 3, initially (i.e., for a key-out condition), the lock cylinder 13 is in the OFF position, and the switch member 31 is attracted to the ferromagnetic portion 36 so that the magnetic sensor switch 30 is in the open condition. When the mated key 22 is inserted into the cylinder 13, the cylinder 13 is released for rotation relative to the sleeve 11. Upon releasing the cylinder 13, the cylinder 13 can rotate from the OFF position through the RUN position to the START position.

Referring to FIGS. 4 and 5, as the actuator 26 approaches the sensor 30 and the active region 71, the magnetic field produced by the actuator 26 attracts the switch member 31. The switch member 31 moves or shifts to the bottom of the case 32 and into contact with the conductive member 33 and the body of case 32. The switch member 31 bridges the gap 23 between the conductive member 33 and the case 32, completing the circuit connection of the switch (FIG. 7) and generating an ignition enable signal for the microprocessor of the vehicle ignition system. The cylinder 13 is then rotated from the START position to the RUN position, as is conventional.

Referring to FIG. 7, when the sensor 30 is operated to its closed condition, the sensor 30 completes a circuit path for resistor 41 between nodes 42 and 43. The voltage drop across the resistor 41, the value of which acts as a code, produces an output signal at node 42. The output signal is supplied to the input 50 of the comparator 46. Under normal conditions, the magnitude of the output signal is within a predetermined range defined by module 60, resulting in the energization of the ignition circuitry and the starting of the vehicle. If the coded signal is outside of the predetermined range, as when an intruder is attempting to defeat the system, the ignition circuitry is not energized. For some vehicles, the vehicle will not start and, for other vehicles, the vehicle can start but the fuel will be "cut."

For the embodiment shown in FIG. 7, the resistor 41 acts as a memory and the value of the resistance acts as a coded value. That is, when the switch 30 closes, a power is provided to the memory (e.g., the resistor 41), which results in the memory supplying a code (e.g., the voltage drop corresponding to the value of the resistor 41) to the comparator 46. However, the coded-signal circuit can include other types of memory that store or maintain a code or value including, and without limitation, to a memory chip, a memory device (e.g., a magnetic memory device, an optical memory device) or similar types of memory.

Referring to FIG. 6, if an intruder attempts to compromise the ignition system by introducing an external magnet to the sensor 30, the coded-signal circuit does not generate an ignition enable signal. For example, an external magnet (e.g., magnet 70C) outside the activation region 71 does not cause the switch member 31 to make contact with the conductive member 33 because of the interfering barriers (e.g., barriers 72 and 73) provided by other physical components of the vehicle. As another example, an external magnet (e.g., magnet 70) does not cause the switch member 31 to move into electrical contact with the case 32 and the conductive member 33. The sensor 30 is strategically oriented relative to the actuator 26 so that a circuit path is completed between the case 32 and the conductive member 33 only when the actuator 26 is moved into the proximity of case 32 and conductive member 33 (i.e., is within the activation region 71).

As can be seen, one feature of this embodiment is that the normally open circuit condition afforded by the sensor 30 precludes reading of the value of the coded resistor 41 by measuring current and/or voltages of the coded-signal circuit 40. If an intruder applies a reverse voltage across connector terminals A and B (FIG. 7) in an attempt to read the resistive value of the resistor 41, the open circuit provided by the magnetic sensor switch 30 prevents such reading. Further, the normally open circuit condition of sensor 30 provides a security function, but requires fewer components and is less expensive to manufacture than typically are required in known security circuitry.

Figure 8:
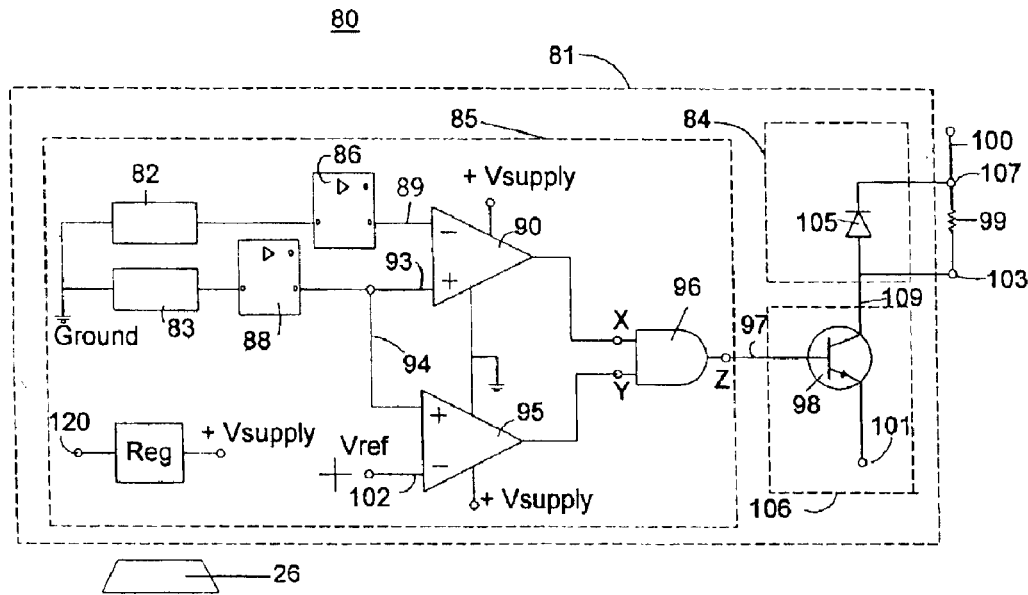
FIG. 8 is a schematic circuit and partial block diagram of another embodiment of the present invention including at least two differential comparators.

Another embodiment of the present invention is shown in FIG. 8. With reference to FIG. 8, a differential magnetic comparator circuit 80 is mounted within a compartment 27 disposed on sleeve 11 (not shown) to generate an actuation signal when the cylinder 13 is rotated to the ON position. The comparator circuit 80 includes an integrated circuit 81 mounted on sleeve 11 for detecting when cylinder 13 is rotated to the ON position. The output of the integrated circuit 81 generates an ignition signal for coded signal generator circuit 84 for transmission to a microprocessor of the vehicle ignition system to actuate the vehicle.

Integrated circuit 81 includes two Hall-effect sensing devices 82 and 83. The Hall-effect sensing device 82 is connected to a first linear amplifier 86, the output of which is connected to the inverting input of a first differential comparator 90. The Hall-effect sensing device 83 is connected to a second linear amplifier 88, the output of which is commonly connected to the non-inverting input of the first differential comparator 90 and the non-inverting input of a second differential comparator 95. The inverting input of the second differential comparator 95 is connected to a source of reference potential. The outputs of the differential comparators 90 and 95 are connected to inputs X and Y, respectively, of an AND logic gate 96. The output of the AND gate Z is connected to the base of a transistor 98.

Differential comparator 90 is used to detect whether the voltage at input line 89 is higher or lower than the voltage at the input line 93. Differential comparator 95 is used to detect whether the voltage at input line 94 is higher or lower than the reference voltage at the input line 102. The difference in the magnetic flux density between the Hall effect devices 82 and 83 is pre-selected so that the outputs of comparators 90 and 95 are logic level high when magnet 26 passes in proximity to the Hall effect devices 82 and 83. When the outputs of the differential comparators 90 and 95 are high, the logic output of the AND gate 96 is also high at output Z.

In one embodiment, the AND gate 96 is connected in circuit to supply an ignition enable signal to a microprocessor of a vehicle control module of the vehicle 19. In another embodiment, the AND gate 96 is connected to a transistor switch 98 and a coded signal generator 84, which is coupled to an anti-tampering system of a vehicle control module, shown in FIG. 9. The coded signal generator 84 includes a resistor 99 with a selected resistance value for defining the coded signal and a passive diode 105, connected in parallel to resistor 99 via outputs 103 and 107. The passive diode 105 serves to block current flow and provides a true coded signal on line 100 consistent with the voltage drop across the resistor 99 of the coded-signal generator 84. The differential comparators 90 and 95 cause transistor switch 98 to be switched ON when a cylinder magnet 26 is properly operated. If a reverse voltage is placed across terminals A and B in an attempt to determine the value of resistor 99 through the transistor switch 98, the diode 105 conducts the reverse current, shorting resistor 99 and providing a false reading of the value of resistor 99. One ordinarily skilled in the art recognizes that the diode 105 must be of a greater wattage than transistor switch 98 such that transistor switch 98 is "burned" out before diode 105 if a high reverse voltage is placed across terminals A and B during an attempt to compromise the system.

Figure 9:
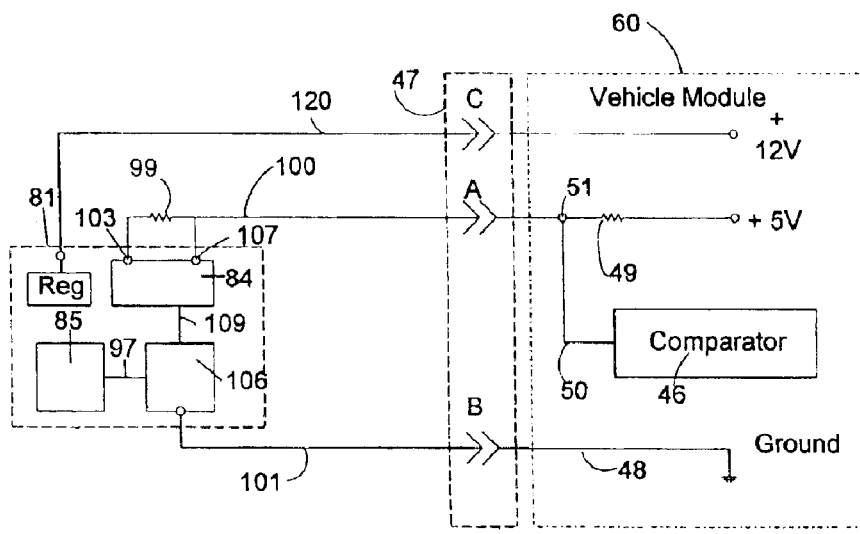
FIG. 9 is a schematic circuit and partial block diagram of the embodiment of FIG. 8 coupled to a standard vehicle module.

Referring to FIG. 9, a coded-output line 100 from the coded-signal generator 84 is coupled to comparator 46, which can be provided in the vehicle module 60. Coded-output line 100 is coupled at terminal A to a node 51 which is connected to an input 50 of the comparator. A pull-up resistor 49 is connected between node 51 and a source of logic level voltage. A common ground lead 101 is tied to the ground line 48 at terminal B. Conductive line 120 is coupled at terminal C to a 12VDC source.

Referring to FIGS. 8 and 9, in operation, a mated key is inserted in the lock cylinder 13 allowing the cylinder 13 to be rotated from the OFF position through the RUN position and to the START position. The magnet 26 on the cylinder (not shown) passes in the proximity of the integrated circuit 81 containing Hall effect devices 82 and 83 and causes a change in the magnetic flux density produced on the two Hall effect devices 82 and 83. The position of magnet 26 causes a corresponding change in the outputs produced by the Hall effect devices 82 and 83. The change in the magnetic flux produced on the Hall effect devices 82 and 83 by the magnet 26 causes the logic output of the differential comparators 90 and 95 to change state. Specifically, differential comparator 90 compares the voltage at input line 89 to the voltage at the input line 93. Differential comparator 95 compares the voltage at input line 94 to the reference voltage at input line 102. If the difference in the flux density produced on the Hall effect devices 82 and 83 are within a prescribed window, then the differential comparators 90 and 95 will produce logic high level outputs.

The AND gate 96 changes state when both inputs X and Y, supplied by comparators 90 and 95, respectively, are logic high level. The logic high level of AND gate 96 energizes transistor 98. When transistor 98 turns "on", a voltage drop is produced across resistor 99, which produces a coded ignition activation signal on line 100. The coded ignition signal is transmitted to the vehicle module 60 via terminal A. The coded signal is introduced into the comparator circuit 46 of the module 60 which enables the ignition and the vehicle on-board computer which controls the fuel system. If the coded signal is within a prescribed window as defined by the module 60, the ignition circuitry is energized, the fuel system is enabled and the vehicle can run. If the coded signal is outside the window, the fuel system is deactivated and the vehicle will not run. If a reverse voltage is placed across terminals A and B in an attempt to determine the value of resistor 99 through the transistor 98, the diode 105 acts as a short and precludes such determination.

Thus, the invention provides, among other things, a new and useful vehicle ignition lock using a magnetic sensor. Various features and advantages of the invention are set forth in the following claims.

What is claimed is:

1. A vehicle ignition lock, comprising:
   a cylinder having a keyway in which a key is insertable to operate the cylinder;
   an electrical circuit having an open state and a closed state;
   a body movable to open and close the electrical circuit;
   an actuator coupled to the cylinder and movable by operation of the cylinder, the actuator movable by the cylinder between a first position in which an interaction of the actuator and the body moves the body to change the state of the electrical circuit and a second position in which the interaction does not move the body to change the state of the electrical circuit.

2. A lock as set forth in claim 1 wherein the actuator includes a magnet having a magnetic field, and wherein the interaction of the actuator and the body includes the interaction of the magnetic field with the body.

3. A lock as set forth in claim 1 wherein the body includes a magnetic field, and wherein the interaction of the actuator and the body includes the interaction of the magnetic field with the actuator.

4. A lock as set forth in claim 3 wherein the actuator includes a second magnetic field, and wherein the interaction of the actuator and the body includes the interaction of the first and second magnetic fields.

5. A lock as set forth in claim 1 wherein at least one of the actuator and the body has at least one magnetic field, and wherein the interaction of the actuator and the body includes the interaction of the at least one magnetic field with at least one of the actuator and the body.

6. A lock as set forth in claim 1 wherein the first position results in the closed electrical circuit and wherein the second position results in the open electrical circuit.

7. A lock as set forth in claim 1 wherein the electrical circuit includes at least two switch contacts, wherein the body touches the at least two switch contacts when the actuator is in the first position, and wherein the body does not touch at least one of the at least two switch contacts when the actuator is in the second position.

8. A lock as set forth in claim 7 wherein the lock further comprises a housing that includes the at least two switch contacts, and wherein the body is disposed within the housing.

9. A lock as set forth in claim 8 wherein a first switch contact is an electrically-conductive rod.

10. A lock as set forth in claim 9 wherein the housing includes a case portion of an electrically conductive material, the case portion including a second switch contact.

11. A lock as set forth in claim 10 wherein the case portion further includes at least one sloping side wall to provide high closed contact integrity between the case position, the body and the conductive rod when the body is in the first position.

12. A lock as set forth in claim 10 wherein the housing further includes a cover portion having an electrically insulated portion that supports the rod and insulates the rod from the case portion.

13. A lock as set forth in claim 12 wherein the cover further includes a ferromagnetic portion, and wherein the body is attracted to the ferromagnetic portion when the actuator is in the second position.

14. A lock as set forth in claim 1 wherein the conductive body is generally spherical in shape.

15. A lock as set forth in claim 1 wherein the actuator comprises a permanent magnet.

16. A lock for a vehicle-ignition, the lock comprising:
    a sleeve;
    a cylinder coupled within the sleeve and having a keyway therein that receives a key used to operate the cylinder;
    a switch including a housing containing at least two spaced apart switch contacts and a movable electrically conductive body disposed within the housing, the body being generally spherical in shape and movable between a switch open position in which the body is located away from at least one of the at least two switch contacts and a switch closed position in which the body contacts the at least two switch contacts, the switch defining a region in which the switch is responsive to the effects of a magnetic field, the switch being coupled to the sleeve so that the region is located within the rotation of the cylinder and is in an orientation in which the body is located in the switch open position in the absence of the magnetic field within the region; and
    a magnet coupled with the cylinder, the magnet producing the magnetic field to move the body from the switch open position to the switch closed position when the magnet is within the region.

17. A lock as set forth in claim 16 wherein the housing includes a case portion of an electrically-conductive material, the case portion including one of the switch contacts, wherein the other switch contact is an electrically-conductive rod, wherein the housing further includes a cover including an electrically insulative portion that supports the rod and insulates the rod from the case portion, and wherein the cover includes a ferromagnetic portion that attracts the body in the absence of the magnetic field.

18. A lock for a vehicle-ignition circuit, the lock comprising:
    a cylinder having a keyway in which a key is insertable to operate the cylinder;
    a switch with at least two switch contacts, an open state, and a closed state;
    a body movable with respect to the contacts to open and close the switch; and
    an actuator movable by the cylinder with respect to the body, at least one of the actuator and the body having at least one magnetic field, the movement of the actuator varying the interaction of the at least one magnetic field with the actuator or the body, the body responsive to the varying interaction by changing to one of the open and closed states.

19. A lock as set forth in claim 18 wherein the actuator has a magnetic field and the body includes a ferromagnetic material, and wherein the movement of the actuator varies the interaction of the magnetic field of the actuator with the body.

20. A lock as set forth in claim 18 wherein the body has a magnetic field and the actuator includes a ferromagnetic material, and wherein the movement of the actuator varies the interaction of the magnetic field of the body with the actuator.

21. A lock as set forth in claim 18 wherein the actuator has a first magnetic field and the body has a second magnetic field, and wherein the movement of the actuator varies the interaction of the first magnetic field with the body and the interaction of the second magnetic field with the actuator.

22. A lock as set forth in claim 21 wherein the interaction of the first magnetic field with the body includes the interaction of the first magnetic field with the second magnetic field, and wherein the interaction of the second magnetic field with the actuator includes the interaction of the second magnetic field with the first magnetic field.

23. A lock as set forth in claim 18 wherein the body is generally spherical in shape.

24. A lock as set forth in claim 23 wherein the body is a permanent magnet.

25. A lock as set forth in claim 18 wherein the lock further includes a case and a cap coupled to the case to define an enclosure, wherein the case includes a case portion that defines a first switch contact, and wherein the cap supports a second switch contact.

26. A lock as set forth in claim 25 where the second switch contact is generally rod-shaped.

27. A lock as set forth in claim 18 wherein the case further includes at least one sloping side wall to provide high closed contact integrity between the first switch contact, the body, and the second switch contact when the body is in the closed state.

28. A lock as set forth in claim 18 wherein the cap includes an insulated portion and a ferromagnetic portion, and wherein the second switch contact is supported by the insulated portion of the cap.

29. A vehicle comprising:
    a vehicle-control module;
    a sleeve;
    a cylinder coupled within the sleeve, the cylinder having a keyway therein for receiving a key used to operate the cylinder;
    a switch with at least two contacts, an open state, and a closed state;

a conductive ferromagnetic body being movable with respect to the switch contacts to open and close the switch; and a magnet having a magnetic field, the magnet movable by the cylinder to move the magnetic field toward and away from the body, the body responsive to movement of the magnetic field by changing to one of the open and closed states.

30. A vehicle as set forth in claim 29 wherein the switch is in the closed state when the body touches the at least two contacts, and wherein the switch is in the open state when the body does not touch more than one of the at least two contacts.

31. A vehicle as set forth in claim 29 wherein the magnet is movable by the cylinder between a first position in which the body is responsive to the magnet field such that the body touches the at least two contacts, and a second position in which the body is non-responsive to the magnet field such that the body does not touch at least one of the two contacts.

32. A vehicle as set forth in claim 29 wherein the body is generally spherical in shape.

33. A vehicle as set forth in claim 29 wherein the switch includes a case and a cap coupled to the case, wherein the case includes a portion that defines a first switch contact, wherein the cap has an insulated portion and a ferromagnetic portion, and wherein a second switch contact is supported by the insulated portion of the cap.

34. A vehicle as set forth in claim 33 wherein the second switch contact is generally rod-shaped.

35. A vehicle as set forth in claim 33 wherein the body is a permanent magnet whereby the body is attracted to the ferromagnetic portion of the cap when the magnetic field of the magnet is away from the body.

36. A vehicle-ignition system comprising:

a lock including a cylinder rotatably coupled with a sleeve, the cylinder having a magnetic actuator and a keyway that receives a key that allows the cylinder to rotate;

a coded-signal circuit configured to generate a coded signal in response to the rotational position of the cylinder;

a comparator configured to generate an activation signal when the coded signal is acceptable; and a sensor coupled to the sleeve and connected in circuit with the coded-signal circuit, the sensor being configured to define an active region in which the sensor is responsive to the effects of a magnetic field, to interrupt the circuit unless the actuator is properly rotated to the active region, and to complete the circuit causing the coded signal to be generated when the actuator is rotated within the region, the sensor including a body movable to interrupt the circuit or to complete the circuit.

37. A system as set forth in claim 36 wherein the actuator includes a magnet coupled to and rotating with the cylinder, and wherein the sensor causes the coded signal to be generated in response to the magnet being within the active region.

38. A system as set forth in claim 37 wherein the sensor includes a housing containing a pair of spaced apart switch contacts and a movable ferromagnetic body disposed within the housing, the ferromagnetic body being movable between a first position wherein the ferromagnetic body is located away from at least one of the switch contacts, and a second position wherein the ferromagnetic body contacts both of the switch contacts, the housing being coupled to the sleeve in an orientation in which the ferromagnetic body is located in the first position in the absence of a magnetic field in the active region.

39. A system as set forth in claim 37 wherein the magnet shifts the ferromagnetic body from the first position to the second position when the cylinder is rotated within the active region.

40. A system as set forth in claim 37 wherein the coded-signal circuit includes a resistor, wherein the coded signal has a relationship to a magnitude of the resistor, and wherein the comparator generates the activation signal when the coded signal is within an acceptable range.

41. An ignition-lock system for a vehicle, the lock system comprising:

a sleeve;

a cylinder couple within the sleeve, the cylinder including a keyway therein that receives a key used to operate the cylinder;

a sensor coupled to the sleeve, the sensor having an active state and an active region, the sensor including a body movable to close an electrical circuit for the active state;

an actuator coupled to the cylinder to move with the cylinder, the actuator causing the sensor to be in the active state when the actuator is within the active region;

a memory including a code; and a comparator coupled to the memory and being configured to receive a coded signal from the memory when the sensor is in the active state, the coded signal including the code, and to generate an activation signal when the memory supplies the correct code.

42. A system as set forth in claim 41 wherein the actuator includes a magnet, and wherein the sensor is in the active state when the magnet is within the active region.

43. A system as set forth in claim 41 wherein the memory includes a resistor having a value, and wherein the value represents the code.

44. A system as set forth in claim 41 wherein the memory includes a chip, and wherein the code is stored in the chip.

45. A system as set forth in claim 41 wherein the memory includes a memory device, and wherein the code is stored in the memory device.

* * * * *